(12) United States Patent
Gabriel et al.

(10) Patent No.: US 9,426,067 B2
(45) Date of Patent: Aug. 23, 2016

(54) INTEGRATED SWITCH FOR DYNAMIC ORCHESTRATION OF TRAFFIC

(75) Inventors: Cynthia A. Gabriel, Gilroy, CA (US);
Bill Shao, Pleasanton, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 13/494,397

(22) Filed: Jun. 12, 2012

(65) Prior Publication Data

US 2013/0329731 A1 Dec. 12, 2013

(51) Int. Cl.
| | |
|---|---|
| *H04L 12/28* | (2006.01) |
| *H04L 12/56* | (2006.01) |
| *H04L 12/741* | (2013.01) |
| *H04L 12/725* | (2013.01) |
| *H04L 12/947* | (2013.01) |
| *H04L 29/08* | (2006.01) |

(52) U.S. Cl.
CPC ............ *H04L 45/741* (2013.01); *H04L 45/308* (2013.01); *H04L 45/74* (2013.01); *H04L 49/25* (2013.01); *H04L 67/1004* (2013.01)

(58) Field of Classification Search
CPC ... H04L 45/74; H04L 49/039; H04L 45/308; H04L 49/25; G06F 15/16
USPC .......................................................... 370/392
See application file for complete search history.

(56) References Cited

U.S. PATENT DOCUMENTS

| | | | |
|---|---|---|---|
| 5,181,017 A * | 1/1993 | Frey, Jr. ................. | H04L 45/06 340/2.1 |
| 6,377,998 B2 | 4/2002 | Noll et al. | |
| 6,392,250 B1 | 5/2002 | Aziz et al. | |
| 6,553,030 B2 | 4/2003 | Ku et al. | |
| 6,645,645 B1 | 11/2003 | Adachi et al. | |
| 6,697,368 B2 | 2/2004 | Chang et al. | |
| 6,727,644 B2 | 4/2004 | Hatwar et al. | |
| 6,735,198 B1 | 5/2004 | Edsall et al. | |
| 7,184,444 B2 | 2/2007 | Posey | |
| 7,194,550 B1 | 3/2007 | Chamdani et al. | |
| 7,240,364 B1 | 7/2007 | Branscomb et al. | |
| 7,266,598 B2 | 9/2007 | Rolia et al. | |
| 7,327,748 B2 | 2/2008 | Montalvo et al. | |
| 7,821,925 B2 | 10/2010 | Davies | |
| 7,953,074 B2 | 5/2011 | Pettey et al. | |

(Continued)

FOREIGN PATENT DOCUMENTS

| | | |
|---|---|---|
| KR | 1020060066644 A | 6/2006 |
| KR | 1020060084733 A | 7/2006 |

OTHER PUBLICATIONS

Final Office Action in related U.S. Appl. No. 12/741,225, mailed on Oct. 29, 2012; 14 pages.

(Continued)

*Primary Examiner* — Khaled Kassim
*Assistant Examiner* — Syed S Ali
(74) *Attorney, Agent, or Firm* — Shimokaji IP (57) ABSTRACT

A network element within a data center comprises a switch adapted to receive a data packet, a server in communication with the switch, and a switching engine in the switch. The switching engine may be configured to modify policy header information in the data packet to direct the packet to the server. The server may be configured to modify the policy header information while the data packet is in the server to return the data packet to said switch.

8 Claims, 6 Drawing Sheets

(56) References Cited

U.S. PATENT DOCUMENTS

| | | | |
|---|---|---|---|
| 7,978,690 B2 | 7/2011 | Abel et al. | |
| 8,160,082 B2 | 4/2012 | Harris et al. | |
| 8,553,537 B2 | 10/2013 | Chao et al. | |
| 8,867,341 B2 | 10/2014 | Shao et al. | |
| 2003/0074467 A1 | 4/2003 | Oblak et al. | |
| 2004/0098499 A1 | 5/2004 | Tamai | |
| 2005/0111455 A1 | 5/2005 | Nozue et al. | |
| 2005/0182815 A1 | 8/2005 | Offredo et al. | |
| 2006/0080446 A1 | 4/2006 | Bahl | |
| 2006/0095960 A1 | 5/2006 | Arregoces et al. | |
| 2006/0158104 A1 | 7/2006 | Lijima et al. | |
| 2006/0273714 A1 | 12/2006 | Forrest et al. | |
| 2007/0180113 A1 | 8/2007 | Van Bemmel | |
| 2007/0183415 A1* | 8/2007 | Fischer et al. | 370/389 |
| 2007/0195773 A1* | 8/2007 | Tatar | H04L 49/1546 370/392 |
| 2007/0244320 A1 | 10/2007 | Inoue et al. | |
| 2008/0002579 A1 | 1/2008 | Lindholm et al. | |
| 2008/0163372 A1 | 7/2008 | Wang | |
| 2008/0177896 A1* | 7/2008 | Quinn | G06F 9/5055 709/238 |
| 2010/0046558 A1* | 2/2010 | Velev | H04W 28/06 370/477 |
| 2010/0097992 A1* | 4/2010 | Velev | H04L 12/66 370/328 |
| 2010/0187552 A1 | 7/2010 | Lee et al. | |
| 2010/0265824 A1* | 10/2010 | Chao | H04L 12/66 370/235 |
| 2011/0026403 A1* | 2/2011 | Shao | H04L 67/2895 370/235 |
| 2011/0026527 A1* | 2/2011 | Shao | H04L 12/4666 370/392 |
| 2011/0286324 A1* | 11/2011 | Bellagamba | H04L 41/0677 370/219 |
| 2012/0076048 A1* | 3/2012 | Kanekar | H04L 12/4641 370/254 |
| 2012/0117228 A1* | 5/2012 | Gabriel | H04L 47/00 709/224 |
| 2012/0320788 A1* | 12/2012 | Venkataramanan | H04L 47/2458 370/253 |
| 2013/0332555 A1* | 12/2013 | Gabriel | H04L 67/1095 709/208 |

OTHER PUBLICATIONS

Non-Final Office Action in related U.S. Appl. No. 12/902,703, mailed on May 21, 2014; 27 pages.

Singh, Sumeet, et al. "Service Portability", Record of the 5th Workshop on Hot Topics, Hot Nets V, Irvine, CA, Nov. 29-30, 2006; 6 pages.

Fulcrum Mircrosystems, Load Distribution in Telecom Services Using FocalPoint Reduces System Cost and Improves System Flexibility, Jul. 2008, 7 pages.

James Radley, Load Balancing Between Server Blades Within Atca Platforms, Oct. 2007, 4 pages.

Cisco Systems, Inc., Cisco Data Center Infrastructure 2.5 Design Guide, Dec. 6, 2007, 180 pages.

Final Office Action in related U.S. Appl. No. 12/902,703, mailed on Jan. 22, 2013; 15 pages.

Final Office Action in related U.S. Appl. No. 12/664,060, mailed on Mar. 18, 2013; 26 pages.

Non-Final Office Action in related U.S. Appl. No. 12/664,060, mailed on Sep. 13, 2012; 17 pages.

Non-Final Office Action in related U.S. Appl. No. 12/902,703, mailed on Aug. 30, 2012; 15 pages.

Cisco Systems, The Global Server Load Balancing Primer, White Paper by Cisco Systems, 2004, 20 pages.

Notice of Allowance and Fee(s) Due in related U.S. Appl. No. 12/664,060, mailed on Jun. 12, 2013; 15 pages.

Notice of Allowance and Fee(s) Due in related U.S. Appl. No. 12/741,225, mailed on May 29, 2013; 10 pages.

Non-Final Office Action in related U.S. Appl. No. 12/741,225, mailed on May 3, 2012; 14 pages.

International Preliminary Report on Patentability for PCT/US2008/082707, dated May 11, 2010, 6 pages.

International Search Report and Written Opinion for PCT/US2008/082707 dated Jan. 12, 2009; 8 pages.

International Search Report for PCT/KR2008/004869 filed Aug. 21, 2008.

Final Office Action in related U.S. Appl. No. 12/900,579, mailed on Apr. 17, 2014; 14 pages.

Notice of Allowance in related U.S. Appl. No. 12/900,579, mailed on Jun. 11, 2014; 5 pages.

Non-Final Office Action in related U.S. Appl. No. 12/900,579, mailed on Sep. 18, 2013; 13 pages.

* cited by examiner

INTEGRATED SWITCH FOR DYNAMIC ORCHESTRATION OF TRAFFIC

BACKGROUND

The present invention relates to data processing, and more specifically, to an integrated switch for dynamic orchestration of traffic.

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. In addition, data centers typically deploy network security components, such as firewalls, VPN (virtual private network) gateways, and intrusion detection systems.

In traditional networking, routers and switch devices usually refer to a MAC (Media Access Control) address, to a VLAN (Virtual Local Area Network) identifier, or to zoning information within a given packet to forward that packet. The source and destination of a data packet are typically coded onto the packet. The packet may be received through an ingress switch that reads the embedded destination information and routes the packet to a server. The server may process the packet according to whatever application the packet is associated with and forward the packet to an egress switch and ultimately to its pre-coded destination.

SUMMARY

According to one embodiment of the present invention, a switch comprises one or more externally facing ports configured to receive a data packet; one or more server-facing ports configured to communicate with a server; a switching engine, in the switch, configured to include policy header information in the data packet, the policy header information including instructions directing the packet through one of the server-facing ports to the server and instructions to the server to modify a destination of the packet.

According to another embodiment of the present invention, a network element comprises a master switch in active mode; a slave switch in standby mode; a plurality of servers in communication with the master and slave switches; and a first switching engine in the master switch; and a second switching engine in the slave switch, wherein the first and second switching engines are configured to direct data packets received from client systems, or from other network elements, to one or more of the servers, and wherein the plurality of servers are configured to modify policy header information in the data packets to: return one of the data packets back to the master switch if said one of the data packets was received by the master switch, or return one of the data packets back to the slave switch if said one of the data packets was received by the slave switch.

According to still yet another embodiment of the present invention, a computer program product for orchestrating traffic in a data center, the computer program product comprising: a computer readable storage medium having computer readable program code embodied therewith, the computer readable program code comprising: computer readable program code configured to identify an ingress switch of a network element within the data center; identify an egress switch of a network element within the data center; designate the ingress switch as a master switch; designate the egress switch as a slave switch; operate the master switch in an active mode; operate the slave switch in a stand-by mode; receive at the master switch, a packet from a source; modify, while in the master switch, a destination of the packet to a server in the network element; receive, at the server the packet from the master switch; process the packet at the server according to application logic; modify, while in the server, the destination of the packet to a client system or another network element; and send the packet from the server, back through said switch from where it was received, to a client system or network element.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As generally described herein, the network elements of a data center employ traffic orchestration mechanisms for dynamically controlling the distribution of packet traffic into and from a server of a network element within the data center.

Figure 1A:
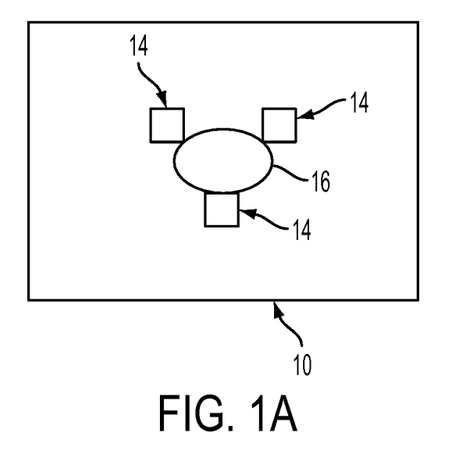
FIG. 1A is a block diagram of a networking environment including a data center with a plurality of network elements in accordance with an exemplary embodiment of the present invention.

Referring now to FIG. 1A, the data center 10 is generally a facility that houses various computers, routers, switches, and other associated equipment in support of applications and data that may be integral to the operation of a business, organization, or other entities. The data center 10 may include a plurality of network elements 14 in communication with each other over a network 16 of communication links. Each of the network elements 14 may be independent (standalone) electronic enclosures. The data center 10 may have fewer or more than the three network elements 14 shown. In addition, embodiments of the data center 10 may be at a single site or distributed among multiple sites.

Figure 1B:
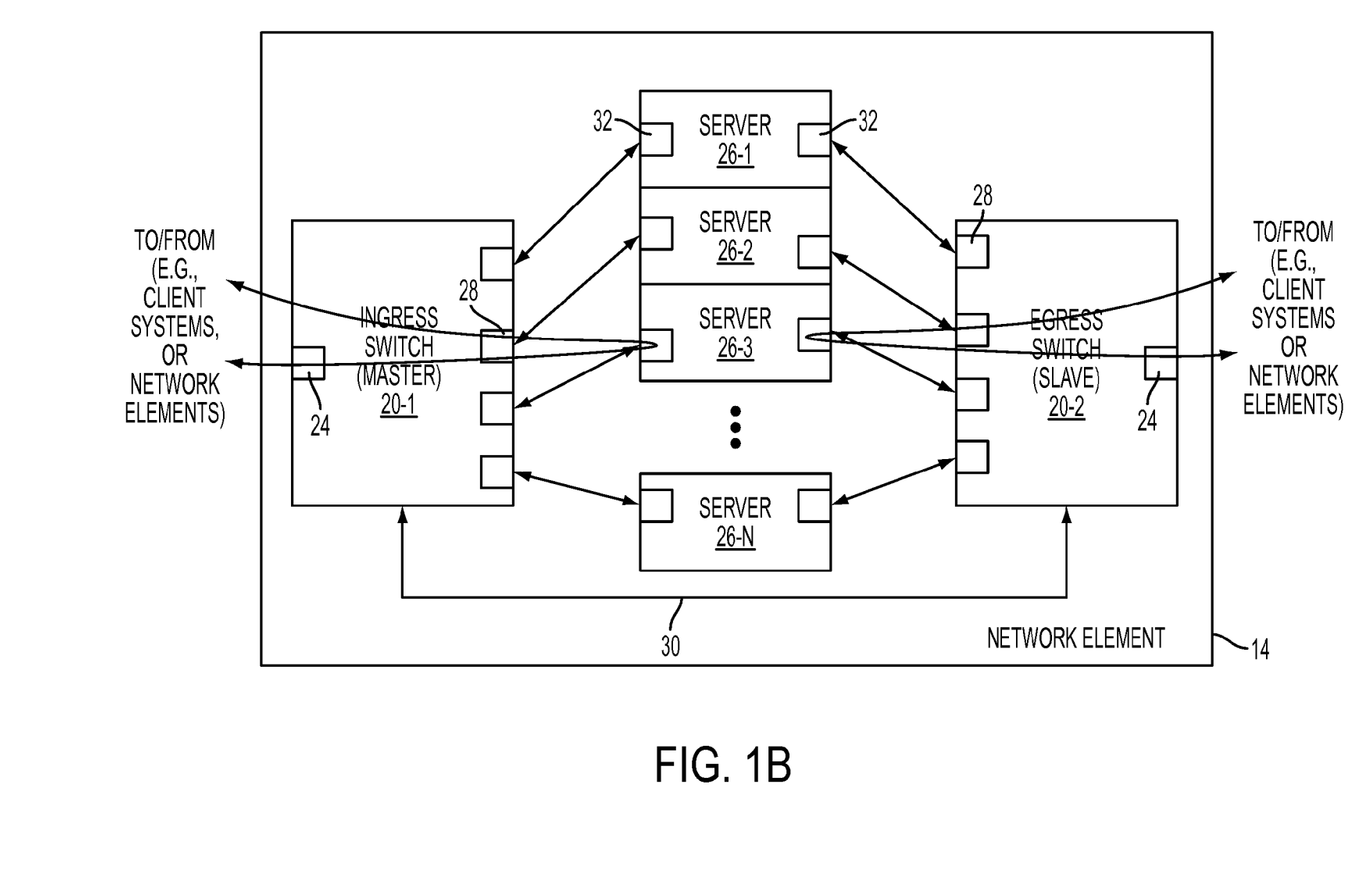
FIG. 1B is a functional block diagram of an embodiment of a network element used in the data center of FIG. 1A.

Referring now to FIG. 1B, a network element 14 is shown according to an exemplary embodiment. In one aspect, the network element 14 may be a system providing bi-directional data processing. The network element 14 may include a plurality of servers 26-1, 26-2, 26-3, 26-N (generally, 26). Each server 26 may be in communication with an ingress switch 20-1 and an egress switch 20-2. The ingress switch 20-1 may be referred to as the master switch; the egress switch 20-2, as the slave. In another aspect, the network element 14 may be configured for active-standby operation where only the master switch 20-1 is actively processing traffic while the slave switch 20-2 is on standby mode. The ingress switch 20-1 may receive incoming packets, arriving either from client systems (when the ingress switch 20-1 is at an ingress location of the network element 14) within a data center 10 or from other network elements 14 within the data center 10, and may forward the packets to servers 26 within the network element 14. In an exemplary embodiment, the egress switch 20-2 may receive packet traffic from the servers 26 and forward the packet traffic outside the network element 14 to other network elements 14 within the data center 10. In another exemplary embodiment, the egress switch 20-2 may receive incoming packets external from the network element 14, arriving either from client systems or from other network elements 14 within the data center 10, similar to the ingress switch 20-1, and forward the packets to servers 26 within the network element 14.

In general, the networking element 14 provides switching and server services for packet traffic from the client systems. Through an external management agent (not shown), an administrator of the data center 10 may communicate with one or more of the network elements 14 in order to manage the packet direction of the network elements 14, as described in more detail below. A management station (not shown) may connect directly (point-to-point) or indirectly to a given network element 14 of the data center 10 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). Using a network protocol, such as Telnet or SNMP (Simple Network Management Protocol), the management station (not shown) may access a command-line interface (CLI) of the given network element 14.

Each switch 20-1, 20-2 (generally, 20) may include at least one externally facing port 24 and a plurality of server-facing ports 28. In an exemplary embodiment, the switch 20 may be an Ethernet switch and the ports 24, 28 of the switch may support 10 GB line rates. For a network element 14 at an ingress location of the data center 10, the externally facing port 24 of the ingress switch 20-1 may be in communication with the client systems. For network elements not at an ingress location, the externally facing port 24 of the ingress switch 20-1 may be in communication with another network element 14. The externally facing port 24 of the egress switch 20-2 may be in communication with another network element 14 or with client systems. The ingress and egress switches 20 may have more than one externally facing port 24. Each of the server-facing ports 28 of the ingress and egress switches 20 may be connected to a port 32 of a server 26. In addition, the ingress switch 20-1 and egress switch 20-2 may be in communication with each other over an inter-switch network link 30. The network link 30, for example, may provide server state information from the master switch 20-1 to the slave switch 20-2. The server state information of master switch 20-1 may include which servers 26 may correspond with a source of incoming data packet traffic. If an active-standby mode of operation is desirable, the slave switch 20-2 may handle processing of packet traffic incoming to the data center 10 when the master switch 20-1 fails. The slave switch 20-2 may orchestrate traffic to the servers 26 based on the server state information of master switch 20-1.

Each server 26 may be a computer that provides one or more services to the data center 10, examples of which include email servers, proxy servers, DNS servers, proxy appliances, real servers. Examples of services that may be provided by the servers 26 include firewall services, Intrusion Prevention/Intrusion Detection (IPS/IDS) services, Server Load Balancing (SLB), and Application Delivery Centers (ADC) services. All of the servers 26 in the network element 14 may or may not perform the same function.

Figure 2:
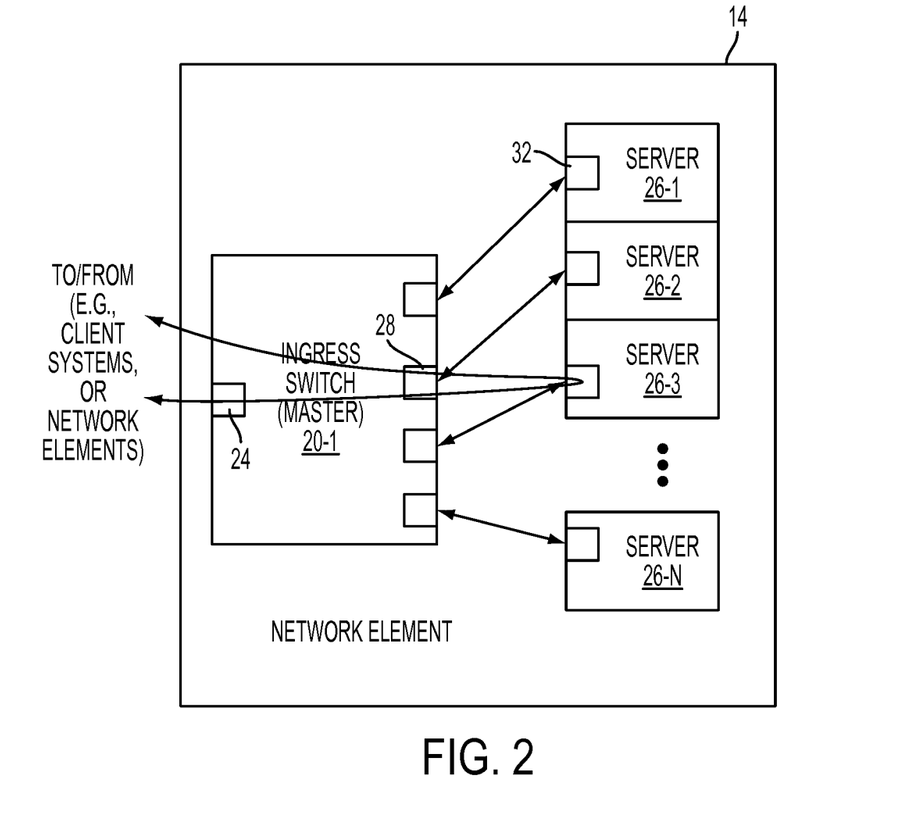
FIG. 2 is an enlarged view of an active half of the network element of FIG. 1B.

Referring now to FIG. 2, the switch 20 is shown as part of a network element 14 sans the remaining elements of the network element 14 enclosure of FIG. 1B. For sake of illustration, the ingress switch 20-1 is shown; however; it will be understood that the description herein may also refer to the egress switch 20-2. In one aspect, the ingress switch 20-1 and egress switch 20-2 may each be configured to provide bi-directional packet routing while maintaining server state among the servers 26. It may be appreciated that the bi-directional servicing of the switches 20 may provide increased bandwidth processing within the data center 10. In general, the switches 20 may be configured so that a server 26 connected to one or both of the switches 20 may be enabled to receive and return traffic to the same switch.

For example, the ingress switch 20-1 may receive a packet over the externally facing port 24 and route the packet to one of the servers 26. The server 26 may perform its designated service or services. When processed within the server 26, the packet may be analyzed for its destination. Where some packet processing and routing may typically forward the packet to an egress switch, for example the egress switch 20-2, exemplary embodiments of the present invention may apply directional information to the packet to return it back to the ingress switch 20-1 so that the packet may be forwarded out of the network element 14 through one or more of its externally facing ports 24 and further sent to its destination outside of the data center 10.

Similarly, the egress switch 20-2 may receive a packet over the externally facing port 24 and route the packet to one of the servers 26. The server 26 may perform its designated service or services. When processed within the server 26, the packet may be analyzed for its destination. Where some packet processing and routing may typically forward the packet to an ingress switch, for example the ingress switch 20-1, exemplary embodiments of the present invention may apply directional information to the packet to return it back to the egress switch 20-2 so that the packet may be forwarded out of the network element 14 through one or more of its externally facing ports 24 and further sent to its destination outside of the data center 10.

Figure 3:
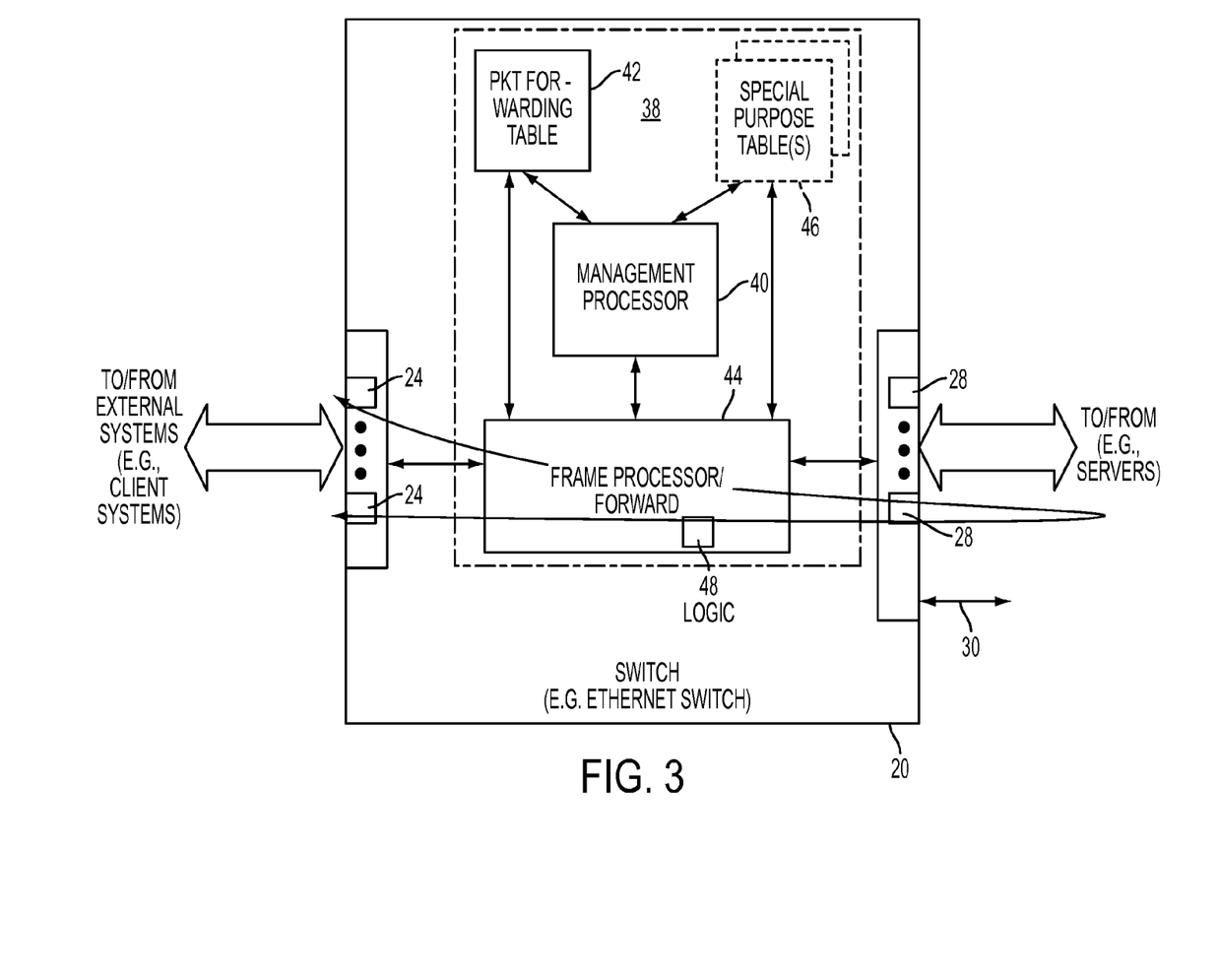
FIG. 3 is an exemplary switch employed in the network element of FIG. 1B.

Referring to FIG. 3, an exemplary embodiment of the switch 20 (representative of the egress and ingress switches) is shown including an externally facing port 24 in communication with external systems (i.e., client systems or other network elements 14), and a plurality of server-facing ports 28. In an exemplary embodiment, the switch 20 may be an Ethernet switch and the ports 24, 28 of the switch may support 10 GB line rates.

The switch 20 may also include a switching engine 38 comprising a management processor 40, a packet-forwarding table 42, a frame processor/forwarder 44, and a special-purpose table 46. Examples of the packet-forwarding table 42 may include an L2 forwarding table, L3 routing table, link aggregation (i.e. static or LACP trunk) table, Equal Cost Multi Path (ECMP) table, frame/field processor (i.e. access control list) table, etc. The switch 20 may be implemented with an ASIC (Application Specific Integrated Circuit) technology on one or more semiconductor chips. In general, the switching engine 38 may bi-directionally forward packets between externally facing ports 24 and server-facing ports 28. In some embodiments, the switching engine 38 may modify the information in a packet received at the switch 20 to direct the packet to one of the servers 26 so that the server 26 may return the packet back to the same switch.

The management processor 40 may dynamically add, remove, or modify entries in the packet-forwarding table 42. The management processor 40 may constantly monitor the health of the servers 26 (FIGS. 1B and 2) by using various health-check mechanisms. Examples of such health-check mechanisms may include a PING health check, an ARP (Address Resolution Protocol) health check, a UDP/TCP (User Datagram protocol/Transmission Control Protocol) health check, a service-based health check (i.e. HTTP, SMTP, SSL, SIP, etc.), and a user scriptable health check.

The packet-forwarding table 42 may contain entries that determine the source and destination of packet traffic arriving at the switch 20 through one of its externally facing ports 24. In either instance of the ingress switch 20-1 or egress switch 20-2, each entry of the packet-forwarding table 42 may map a unique value to one of the server-facing ports 28 of the switch 20, each of such ports 28 being connected to a port 32 of one of the servers 26. In general, the table entries of the packet-forwarding table 42 may direct incoming packet traffic across the servers 26 in accordance with a traffic management policy that, in some exemplary embodiments, tries to maintain server state. In maintaining server state, packets from a source may be sent to the same server 26 to provide continuity in the processing of an application. In some embodiments, the entries of the packet-forwarding table 42 may be configured such that incoming packet traffic arriving at the switch 20 through one of its externally facing ports 24 is load balanced across the servers 26 through one of the server-facing ports 28.

In either instance of the ingress switch 20-1 or egress switch 20-2, a special-purpose table 46 may be employed to uniquely map each entry to one of the externally facing ports 24 of the switch (20-1; 20-2), each of such ports 24 being connected to a client system. In general, the special-purpose table 46 may establish the routing of the packet traffic in accordance with a traffic management policy. In one aspect, the special-purpose table 46 may change the destination information of the received packet from its original destination to one corresponding to its intended server 26. In some embodiments, the entries of the special-purpose table 46 my be configured such that the incoming packet traffic arriving at the switch 20 through one of its externally facing ports 24 is provided with directional information to associate a server-facing port 28 with one of the servers 26 and the switch 20. The special-purpose table 46 may provide policy header information with the packet that the server 26 may use to process the destination of the packet. For example, the special-purpose table 46 may change an original destination MAC address for the packet to a server MAC address corresponding to the server 26 the packet is directed to. The special-purpose table 46 may also include in the policy header information instructions for the server 26 to change the destination MAC address and/or a VLAN identifier tag encoding additional traffic forwarding rules for the received packet once the packet is processed by the server 26.

The frame processor/forwarder 44 may include logic 48 for executing the packet transfer process. The logic 48 may be implemented as hardware, software, or a combination of hardware and software. In general, the logic 48 may examine content in the policy header of a received packet, generate a value based on header content of the frame, use the generated value as an index into the packet-forwarding table 42 and, based on the server port 28 identified in the accessed table entry, redirect the packet to that server-facing port 28 of the switch 20. The content examined by the logic 48 may be based on a user-specified function or algorithm and may be part of the traffic management policy used by the switch 20 to direct packet traffic.

The server 26 may provide an active role in determining the routing of the packet. For example, the packet received by the server 26 may be processed for its intended application. The server 26 may also modify the destination MAC address and/or the VLAN identifier tag encoding additional traffic forwarding rules for the packet again corresponding to a client system or network element 14. The server 26 may change the destination MAC address and/or VLAN identifier tag directly in the packet specifying a new MAC address or any one of the configured next hop destinations and/or VLAN tags. The packet may be embedded with return information designating the switch 20 (that originally supplied the packet to the server 26, e.g. ingress switch 20-1) as a destination along the packet's path to a client system or other network elements 14. The server 26 may change the destination MAC address in the packet itself prior to sending the packet to the switch 20. Forwarding information in addition to the destination MAC address may be embedded in the packet such as changing, adding, or removing a VLAN tag used to convey application specific information pertaining to traffic manipulation rules prior to sending the packet to the switch 20. The packet, instead of being sent through the egress switch 20-2, may be sent back through the ingress switch 20-1 on to its next destination.

Figure 4:
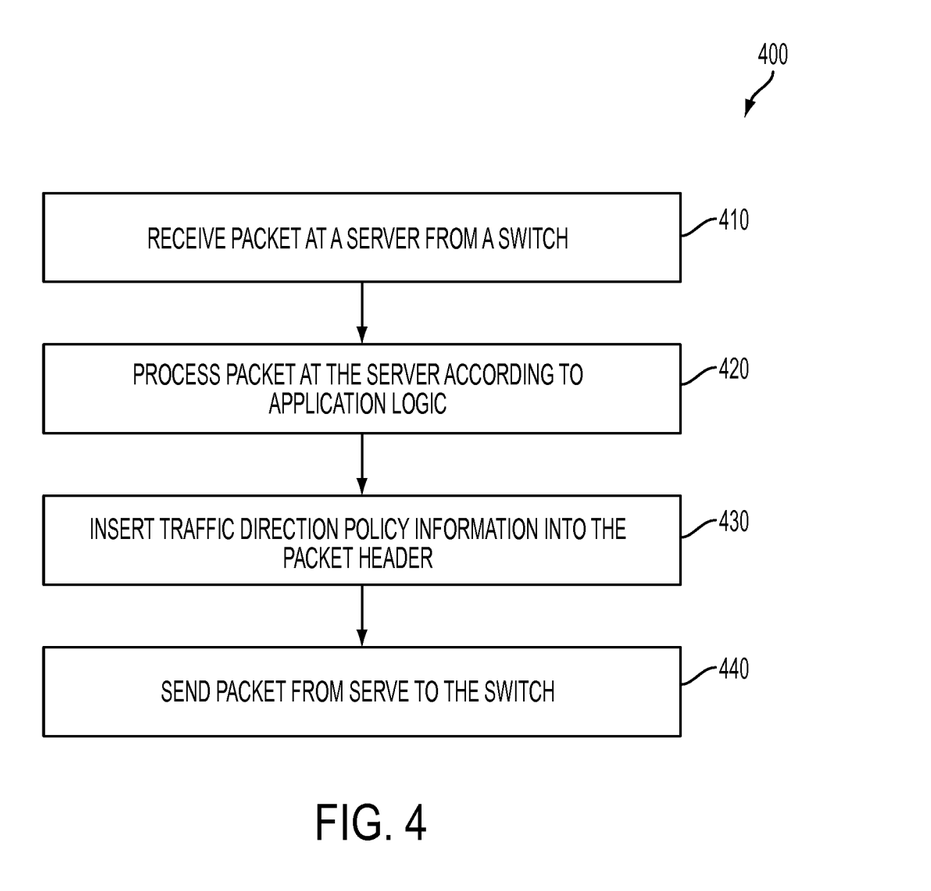
FIG. 4 is a flow chart of a process according to another exemplary embodiment of the present invention.

FIG. 4 shows an exemplary embodiment of a process 400 for dynamic orchestration of traffic through the data center 10. At step 410, the server 26 may receive a packet from the switch 20. In step 420, the packet may be processed at the server 26 according to application logic. The application logic may include code according to the application being processed by the server 26. In step 430, direction policy information may be inserted into packet header of the packet. The direction policy information may direct the packet to be sent back to the switch 20 from which it came or direct the packet to be sent outside the network element 14 through the switch 20 from which it came. In step 440, the packet may be sent back from the server 26 to the switch 20.

Figure 5:
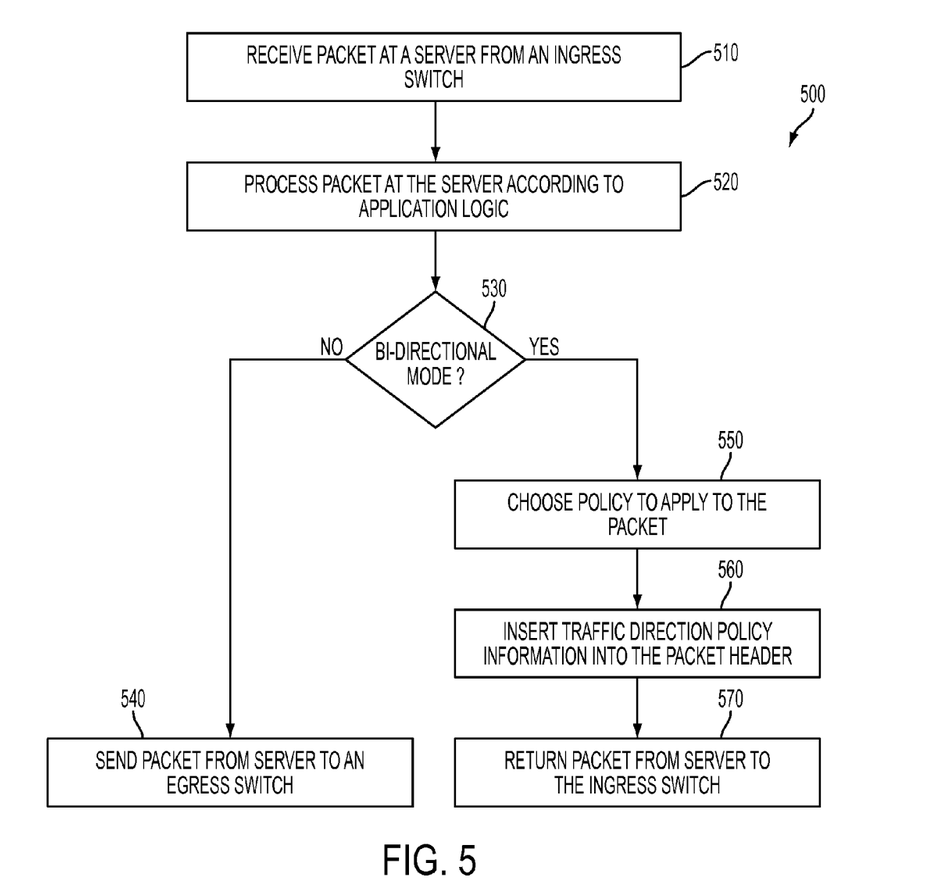
FIG. 5 a flow chart of a process according to yet another exemplary embodiment of the present invention.

Referring now to FIG. 5, a process 500 for bi-directional dynamic traffic orchestration in the data center 10 is shown according to an exemplary embodiment. The process 500 is similar to process 400 except that a determination of whether a packet should be processed under a uni-directional mode sending a packet through both switches 20 or a bi-directional mode sending a packet to and from a server through the same switch 20 is included. Although described primarily with reference to the ingress switch 20-1, the process 500 applies similarly to the dynamic orchestration of traffic passing through the egress switch 20-2. In step 510, a packet may be received at the server 26 from an ingress switch 20-1. In step 520, the packet may be processed at the server 26 according to application logic. In step 530, a determination may be performed as to what mode under which the packet is being processed. If the packet is being processed under a uni-directional mode, then in step 540 the packet may be sent to the egress switch 20-2. If the packet is being processed under a bi-directional mode, then in step 550 the switch 20 from which the packet was received may be identified and the packet may be applied with policies in a policy header identifying, for example, a MAC address corresponding to the switch 20 and/or a VLAN identifier tag encoding additional traffic forwarding rules to convey to the switch 20. In step 560, traffic direction policy information may be inserted into the policy header routing the packet back to the originating switch 20. In step 570, the packet may be returned to, for example, the ingress switch 20-1 based on the traffic direction policy information in the policy header.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A network element, comprising:
an ingress switch, configured to provide bi-directional routing of a packet, wherein the packet contains a special purpose table having entries that are configured such that incoming packet traffic, arriving at the ingress switch through an externally facing ingress switch port, is provided with directional information to associate an ingress switch server-facing port with at least one of a plurality of servers and the ingress switch;
an egress switch, configured to provide bi-directional routing of the packet, wherein the packet contains the special purpose table having entries that are configured such that incoming packet traffic, arriving at the egress switch through an externally facing egress switch port, is provided with directional information to associate an egress switch server-facing port with at least one of a plurality of servers and the ingress switch;
a plurality of servers in communication with the ingress and egress switches;
a first switching engine, in the ingress switch, wherein the special-purpose table is within the first switching engine and is configured to provide data packets at the master switch with directional information to associate a server-facing port on the master switch with one of the plurality of servers, wherein the first switching engine further includes a packet forwarding table configured to map a unique value to one of a plurality of server-facing ports of the master switch, plurality of server-facing ports being connected to a server port; and
a second switching engine in the egress switch,
wherein the first and second switching engines are configured to modify policy header information in the special purpose table of said packet to direct packet traffic received from client systems, or from other network elements, along with the modified policy header information, to one or more of the servers, and
wherein the plurality of servers are configured to further modify policy header information in the special purpose table of said packet to:
return said packet with said further modified policy header information back to the ingress switch if said packet was received by the ingress switch, and
return said packet with said further modified policy header information back to the egress switch if said packet was received by the egress switch.

2. The network element of claim 1, wherein the switching engine is configured to modify policy header information by changing a destination media access control (MAC) address in said packet to a server MAC address corresponding to the server of the one or more servers to which said packet is directed.

3. The network element of claim 2, wherein the plurality of servers are configured to modify policy header information by changing the destination MAC address from the server MAC address to a MAC address of a switch, client system or network element.

4. The network element of claim 1, wherein the switching engine is configured to modify policy header information by adding, removing, or changing a VLAN identifier tag to encode application specific information pertaining to traffic manipulation rules.

5. The network element of claim 4, wherein the plurality of servers are configured to modify policy header information by adding, removing, or changing the VLAN identifier tag to encode traffic forwarding rules other than the destination of said packet.

6. The network element of claim 1, including an inter-switch network link in communication between the ingress switch and the egress switch.

7. The network element of claim 1, wherein the first and second switching engines are configured to maintain server state.

8. The network element of claim 7, wherein the slave switch is configured to orchestrate packet traffic to the plurality of servers based on which servers of the plurality of servers correspond with sources of data packets received through the master switch.

* * * * *